INVENTORS.
JOHN J. ASKINS &
HARRY A. YOUNG
BY Val R. Goshaw
ATTORNEY.

March 1, 1960 J. J. ASKINS ET AL 2,927,153

MOTION PICTURE FILM EDITING SYSTEM

Filed Feb. 10, 1956 2 Sheets-Sheet 2

INVENTORS,
JOHN J. ASKINS &
HARRY A. YOUNG
BY
[signature]
ATTORNEY.

United States Patent Office 2,927,153

Patented Mar. 1, 1960

2,927,153

MOTION PICTURE FILM EDITING SYSTEM

John J. Askins and Harry A. Young, Burbank, Calif., assignors to Radio Corporation of America, a corporation of Delaware Application February 10, 1956, Serial No. 564,659

12 Claims. (Cl. 178—6)

This invention relates to editing apparatus, and particularly to a system including motion picture film and television equipment for facilitating the editing of a plurality of motion picture films.

The basic concept of the present invention is disclosed and claimed in Wolfe and Sharp co-pending application, Serial No. 520,193, filed July 6, 1955. It embodies certain features of this co-pending application and a feature of Blaney U.S. Patent No. 2,331,451 of October 12, 1943, the latter permitting a negative film to be viewed as a positive image. It also embodies a control track or memory tone constant wavelength generator of the type disclosed and claimed in Pettus and Singer co-pending application, Ser. No. 525,556, filed August 1, 1955 now Patent No. 2,843,446, dated July 15, 1958.

This invention utilizes a single memory film on which is recorded, and from which is reproduced, a plurality of control tracks in groups for switching from a plurality of motion picture films to a master editing monitor. By the use of a robot, the original editing or "cutting" of the original films may be repeated, while at the same time, new changes may be made in the procedure. Either group of control tracks may be erased during reversal advancement of the film, while safety features are provided to protect any recorded tone which has been previously recorded.

During the recording of any one control track or tone, erasing energy is impressed on the other heads to maintain clear control track areas. The invention utilizes a single generator for the control signal tone, a single generator for the erase voltages and a single magnetic memory film. The system permits the rapid editing of a plurality of motion picture films simultaneously taken of the same scene or related scenes.

The principal object of the invention, therefore, is to facilitate the editing of a plurality of motion picture films.

Another object of the invention is to provide an improved method of and system for editing a plurality of motion picture films.

A further object of the invention is to provide an improved method of and system for editing motion picture films which permit a repetition of the original editing procedure.

A still further object of the invention is to provide an improved editing system which permits all control tracks to be recorded on the same control track film, permits the simultaneous erasing of a plurality of control track films, and provides safety features to prevent erasing when erasing is not desired.

The novel features which are believed to be characteristic of this invention, both as to the manner of its organization and the mode of its operation, will be better understood from the following description when read in conjunction with the accompanying drawings, in which.

Figure 1:
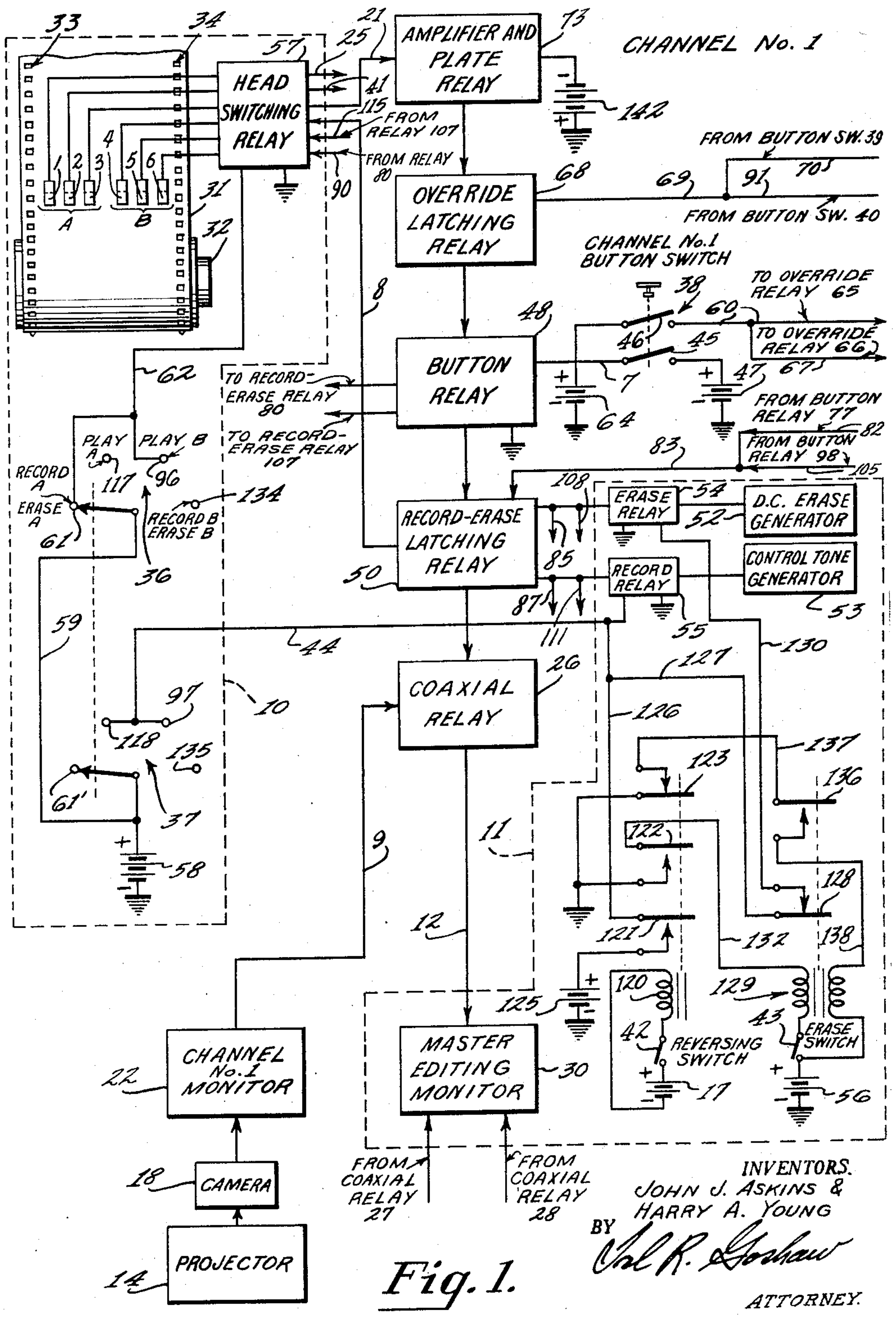
Fig. 1 is a diagrammatic view of one channel embodied in the invention.
Figure 2:
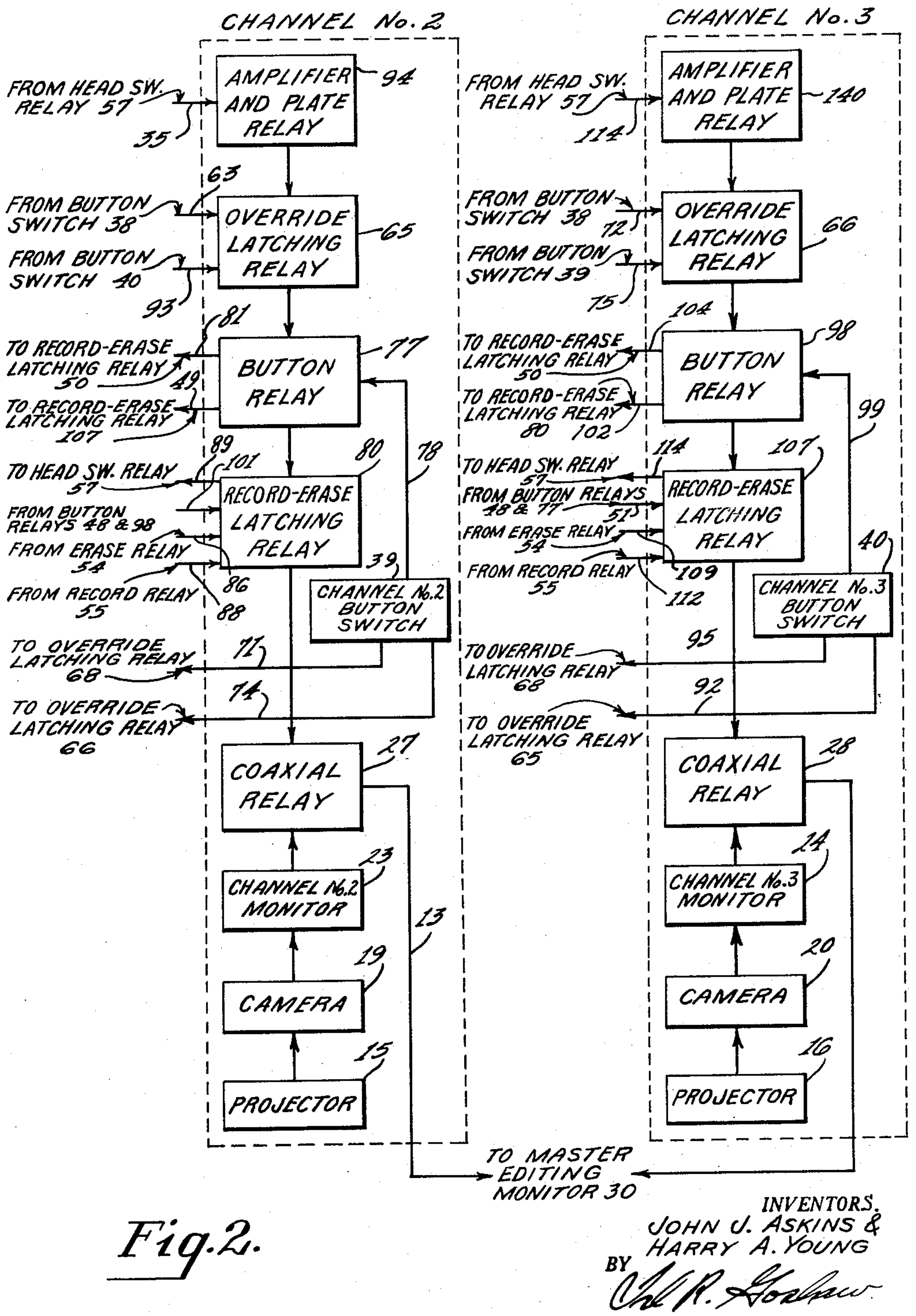
Fig. 2 is a block diagram showing the additional channels embodied in the invention.

Referring now to the drawings, and particularly Fig. 1, the portions of the drawing of Fig. 1 shown within the dotted lines 10 and 11 are common to the system shown in both Figs. 1 and 2, while the other portions of the drawings are duplicated for each channel. In the present illustration, three channels are shown, indicated as channels Nos. 1, 2, and 3, single lines indicating circuits to and from the elements or units in the other channels.

Referring to both Figs. 1 and 2, three motion picture projectors of any suitable type, a continuous film type being preferred, are shown at 14, 15, and 16. These projectors are equipped with concomitant sound reproducing sections (not shown) and which function in the same manner as disclosed in the Wolfe and Sharp co-pending application mentioned above. The projectors are all interconnected to operate synchronously and to have the speed of the film controlled so that the films may be advanced at normal projection speeds and slow speeds, such as frame by frame. The film direction may be reversed at any time. The films used in the projectors 14, 15, and 16 may be films on which has been simultaneously photographed the same scene or related scenes from different angles and at different distances, the sound track for the scenes being present on a separate film or at least on one of the picture films. The sound is reproduced within the hearing of the editor at the control console.

The three picture films, which may be negatives or positives, are projected on television cameras 18, 19, and 20, of any suitable type, such as RCA industrial TV cameras. If the films are negatives, the connections in the cameras may be adjusted so that the negatives appear as positive images on respective television monitors 22, 23, and 24. If positive films are used, the images will appear as positives with the normal TV circuits. Each monitor is connected to its own respective coaxial relay 26, 27, and 28, which will connect and disconnect its respective monitor to and from a master editing monitor 30. That is, energization of any one of the coaxial relays will connect its particular monitor circuit to the single master editing monitor 30 and de-energization will disconnect it. These coaxial relays control the coaxial cable picture transmission circuits. Each individual channel monitor may have one screen size, such as 10 inches, while the master monitor may have a larger screen size, such as 17 inches.

As the individual films are switched from the respective channels to the monitor, a control track or memory tone is recorded for each switching operation at a particular position on the control track or memory film. This film, shown at 31, is preferably magnetic, and may be advanced by a sprocket 32 driven in synchronism with the projectors 14, 15, and 16 in any suitable manner. The film 31 may be a fully coated 35 mm. magnetic film having sprocket hole rows 33 and 34, and which has in contact therewith six aligned magnetic heads 1, 2, 3, 4, 5, and 6. The heads 1, 2, and 3 comprise group "A," and the heads 4, 5, and 6 comprise group "B," adjacent heads 3 and 4 being appreciably separated to avoid crosstalk between the two groups. Since three channels are illustrated, two heads for each channel are provided, the heads serving for recording, detecting, and erasing.

On the console, two ganged switches 36 and 37 are provided which are adjusted in accordance with the particular operation to be performed. Other control elements for the system are button switches 38, 39, and 40, which are manually actuated to do the manual switching of the pictures to master monitor 30, and the switching of the control tone and erase voltages to the selected magnetic heads. Two other control switches are provided, such as a switch 42 associated with reversing the travel of the film 31, and erase switch 43. All of the switches 36, 37, 38, 39, 40, 42, and 43, are located directly in front of the editor on an appropriate console. The other elements of the invention will be described as the operation of the system is explained.

The beginning operation is to thread three films in their proper start positions in the projectors 14, 15, and 16, and to select the portion of one of the films for presentation on the master editing monitor 30. The selection is accomplished by actuating the corresponding one of the button switches 38, 39, and 40. Assuming for purposes of illustration that button switch 38 has been actuated, closing its contacts 45 and 46, a circuit is made from a battery 47 over conductor 7 to button relay 48 to energize it. The energization of button relay 48 energizes its record-erase latching relay 50, which applies a control tone, from a control tone generator 53, through a magnetic head switching relay 57, over conductor 8, to either head 1 or 4, depending on the position of ganged switches 36—37. When no button switch has been actuated, an erase voltage from an erase voltage generator 52 is applied to all three heads 1, 2, and 3, in group "A," or the three heads 4, 5, and 6 in group "B," depending upon the position of switches 36—37. By pushing any one of button switches 38, 39, or 40, its associated record-erase latching relay 50, 80, or 107, as the case may be, is energized and the erase voltage is removed while the record voltage is applied to the corresponding head. The other two heads in the group continue to receive erase voltage. These latching relays to be described in greater detail hereinafter are of the standard type in which the energization of one winding latches the contacts closed, and the energization of a second winding releases or resets the relay to open contact condition.

Since the switches 36 and 37 are in the position shown in Fig. 1, the magnetic head switch relay 57 will be energized over a battery 58, a conductor 59, contacts 61, and conductor 62, this connection insuring that the erase and control signal tone will be impressed on the heads of group "A," namely, 1, 2, and 3, as just described. The head receiving the control tone and the heads receiving the erase voltages are determined by the closing of respective button switches 38, 39, and 40, and the energization of the respective record-erase latching relays 50, 80, and 107. In the present illustration, button switch 38 will connect the control tone generator 53 to magnetic head 1, while the erase generator 52 will continue to supply erase voltage to heads 2 and 3. The control tone generator may be of the type disclosed in the Pettus-Singer patent mentioned above, while the erase generator may be of any source of direct current voltage or any suitable type of erase voltage.

The energization of record-erase latching relay 50 also energizes coaxial relay 26 to connect channel No. 1 projector 14 to the master monitor 30 over conductors 9 and 12. Thus, as the picture and control track films are being advanced, the picture from projector 14 will be shown on master monitor 30, a control tone will be recorded by head 1 at its particular transverse position on film 31, and erase voltage will be applied to heads 2 and 3 at their respective transverse positions. Since contact 46 of button switch 38 is also closed, energy from battery 64 will be connected to override latching relay 65 over conductors 60 and 63 and to override latching relay 66 over conductors 67 and 72 in channels No. 2 and No. 3, respectively, the function of which will be explained hereinafter.

Assume now that the editor desires to cut from the film in projector 14 to the film in projector 15, and to record a control tone to identify this change. This is accomplished by closing button switch 39 in channel No. 2. The actuation of button switch 39 energizes its own button relay 77 over conductor 78. The actuation of button relay 77 energizes its own record-erase latching relay 80, which in turn energizes its coaxial relay 27 to connect the projector 15 to master monitor 30 over condutcor 13, so that the picture in projector 15 may be received on the editing monitor.

Simultaneously, button relay 77 is connected to the record-erase latching relay 50 of channel No. 1 over conductors 81, 82, and 83. This sends a reset voltage to record-erase latching relay 50, which permits erasing voltage to return to head 1, and a reset voltage to be impressed on record-erase latching relay 107 over conductors 49 and 51. Since head 3 is already connected to erase relay 54 over conductors 108 and 109, no circuit change occurs at this relay. The resetting of record-erase latching relay 50 disconnects projector 14 from the master monitor 30. The energization of record-erase relay 80 also connects the control tone generator 53 to head 2 over conductors 87 and 88 through record-erase relay 80 and over conductors 89 and 90 to head switching relay 57. Now as the picture from projector 15 is viewed on master monitor 30, a control track will be provided on film 31 at the position of head 2.

If it is now desired to place the picture in projector 16 on the master monitor 30, button switch 40 of channel No. 3 is actuated, which connects the button switch 40 over conductors 92 and 93 to override latching relay 65 of channel No. 2. Since override latching relay 65 is already in open circuit position, no action occurs at this point. Button switch 40 also sends an energizing voltage to override latching relay 68 of channel No. 1 over conductors 95, 91, and 69. However, since this override latching relay is in open circuit position, no circuit changes occur at this point. However, had either or both override latching relays 65 and 68 been latched, they would have been reset by this energizing voltage.

Button switch 40 also energizes its button relay 98 over conductor 99, which will reset record-erase latching relay 80 of channel No. 2 over conductors 101 and 102, disconnecting relay 80 from record relay 55 to return the erase voltage to head 2. Button relay 98 also sends reset voltage to record-erase latching relay 50 of channel No. 1 over conductors 104, 105, and 83. However, since relay 50 has already been reset by button switch 39 of channel No. 2, no action occurs at relay 50. However, relay 80 of channel No. 2 will disconnect the projector 15 from the master monitor 30, and the energization of record-erase latching relay 107 by button relay 98 will energize coaxial relay 28 to connect projector 16 to master monitor 30. Since it is now desired to place a control tone from the generator 53 on head 3, record-erase latching relay 107 connects the control tone generator 53 through record relay 55, over conductors 111 and 112, through record-erase latching relay 107, and over conductors 114 and 115 to head switching relay 57 and head 3.

Now if it is desired to shift from the picture in projector 16 to the picture in projector 14, button switch 38 is actuated and the previously described action takes place. In this instance, however, record-erase latching relay 107 is reset to remove the picture in projector 16 from master monitor 30, and record-erase latching relay 50 shifts the picture in projector 14 to monitor 30. If the switching is to channel No. 2 from channel No. 3, button switch 39 is actuated and the above described circuits are made to shift the pictures and to record the proper control track.

From the above description, it is to be noted that any one of the pictures in projectors 14, 15, and 16 may be switched to the master monitor 30 at any time, and the control tone generator may be switched to the respectively associated heads 1, 2, or 3, while the other two heads of either group are impressed with erasing voltage. Thus three rolls of film may be simultaneously edited, any portion of each being shiftable to the master monitor while a corresponding control tone is recorded on the film 31.

After this first editing procedure has been completed and it is desired to repeat it, a motor reversing switch is closed to return the film to its starting position. The closing of the motor switch to reverse the film direction closes switch 42, which energizes relay 120 from battery 17, closes its contacts 121 and 122 and opens its contacts 123. The closing of contacts 121 energizes, from battery 125, record relay 55 over conductor 126 and also erase relay 54 to open the circuits of these relays, since they are normally closed. The energizing circuit for relay 54 is from battery 125, closed contacts 121, conductor 126, conductor 127, closed contacts 128 of relay 129, and conductor 130. Thus during the reverse running of the film 31, the erase voltage generator 52 and control tone generator 53 are both disconnected to insure that no energy is impressed on any of the heads.

Now if it is desired to erase the control tracks made by any group of heads, such as heads 1, 2, and 3, during the reverse running of the film 31, erase switch 43 is also closed, which energizes the left hand winding of a latching relay 129. This circuit is from battery 56, conductor 132, contacts 122 to ground. The energization of relay 129 opens its contacts 128 and closes its contacts 136. The opening of contacts 128 breaks the energizing circuit of erase relay 54, permitting its contacts to close and allowing erase voltage to be transmitted to heads 1, 2, and 3 if switches 36 and 37 are in the position shown in the drawing, and to heads 4, 5, and 6 if switches 36 and 37 are on contacts 134 and 135.

Now when the reversing switch 42 is opened, contacts 123 are permitted to close, which energizes the right hand reset winding of relay 129 from battery 56, conductor 138, closed contacts 136 since this is a latching relay, conductor 137, closed contacts 123 to ground. Thus at the end of the reverse run, and with the switch 42 opened, the energizing circuits to erase and record relays 54 and 55 are broken by the opening of contacts 121 and 128, and the relays 54 and 55 can transmit their respective voltages. This is a safety feature which will always provide a control tone and erasing voltage during the editing run. The motor switch, not shown, which controls the direction and speed of film travel, has switch 42 associated therewith so that reverse relay 120 cannot be energized except when the film is running in the reverse direction.

The robot action of the system will now be described: Since only the tracks of group "A" made by heads 1, 2, and 3 have been recorded and not erased, switches 36 and 37 are thrown to their "Play A" positions at contacts 117 and 118. This connects each of heads 1, 2, and 3 through head switching relay 57 to its associated amplifier and plate relays 73, 94, and 140. Head 1 is connected to amplifier 73 over conductor 21, head 2 is connected to amplifier 94 over conductors 25 and 35, and head 3 is connected to amplifier 140 over conductors 41 and 114.

Assuming that the track made by head 1 is being detected, this energy will be impressed on the amplifier 73, which is energized by battery 142. The output of amplifier 73 will actuate override latching relay 68 which closes its contacts to energize button relay 48 in the same manner as the closing of contacts 45 by button switch 38. Thus the detected signal from head 1 will energize record-erase latching relay 50 and coaxial relay 26 to connect the projector 14 to master monitor 30. The operation of record-erase relay 50 will cause the same action as the closing of button switch 38. Since switches 36 and 37 have been adjusted, relays 54 and 55 are energized to break their circuits over a circuit from battery 58, conductor 44 to relay 55, and over conductor 127, contacts 128, and conductor 130 to relay 54. Thus no voltages are impressed on any heads.

It might be mentioned at this point that when switches 36 and 37 are in the position shown in Fig. 1, heads 1, 2, and 3 are connected to their respective record-erase latching relays 50, 80, and 107, and heads 4, 5, and 6 to their respective amplifiers 73, 94, and 140. Now when switches 36 and 37 are thrown to contacts 134 and 135, head switch 57 reverses these connections so that heads 1, 2, and 3 are connected to amplifiers 73, 94, and 140, and heads 4, 5, and 6 are connected to record-erase relays 50, 80, and 107, respectively. However, when switches 36 and 37 are in "Play A" and "Play B" positions, only the heads in the respective groups are connected to the amplifiers, and the other three heads will receive no record or erase voltages.

Now if it is desired to rerecord the control tone with heads 4, 5, and 6 of group "B" during the detection of the control tracks recorded by heads 1, 2, and 3 of group "A," the switches 36 and 37 are adjusted to make contact with contacts 134 and 135. This adjustment releases erase relay 54 and record relay 55 so they close their contacts since the switch 37 has broken their energizing circuits traced above. Thus the system is under control of the robot and if not manually adjusted in any way, the three control tracks produced by heads 4, 5, and 6 will be exactly the same as those being detected by heads 1, 2, and 3, and the projectors will be switched to the master monitor in the same manner and order as above described.

Should it be desired, however, to change the editing procedure; for instance, if it is desired to shift from projector 14 to projector 15 prior to the time this shift was made during the first run, then the operator may close button switch 39 of channel No. 2 and this button switch will actuate its button relay 77 to connect the control tone generator 53 to head 5 and reset override latching relay 68 to disconnect the amplifier 73 from its associated button relay 48. Now the control tone will be impressed on head 5 in channel No. 2 and the picture will be shifted from projector 14 to projector 15. The picture will be shifted back to projector 14 when the button switch 39 is released and head 1 is detecting a tone. The picture from projector 15 will remain on monitor 30 if head 2 is detecting a tone when button switch 39 is released. The picture from projector 16 may be shifted to monitor 30 if head 3 is detecting a tone when button switch 39 is released. Thus any one of the button switches 38, 39, and 40 may be manually operated during the repeat operation at any time to shift the picture to master monitor 30 and change the longitudinal and transverse positions of the newly recorded respective control tracks on film 31.

In the event the group "A" tracks had not been erased and group "B" were being detected and being recorded by group "A" heads, the superimposing of a new control track over a previous one is possible without detriment, since the control tone generator is a constant wavelength generator regardless of the speed of advancement of the films. This permits, after the second run, the switching back and forth between tracks of group "A" and group "B" by shifting switches 36 and 37 between contacts 117—118 and contacts 96—97 during the forward running of the system. Thus parts of each run may be selected and combined. After the final run has been made, the last magnetic record is used to cut the films in projectors 14, 15, and 16. Since this editing process expedites the cutting of the films, the editing time has been reduced appreciably.

The safety features of the above system shown within the dotted line 11 prevent any false erasing of any control tone. Furthermore, the system is extremely flexible, permitting any type of changes to be made manually during the editing by the robot. A single erase generator and a single control tone generator are used for the entire system and all control tracks are recorded on and reproduced from a single film to reduce the over-all system to a minimum. Although three channels for three films have been illustrated, four or more channels can be added by duplicating the necessary units. Two films may be edited by using only two of the channels shown.

We claim:

1. An editing system comprising a plurality of film projectors adapted to project pictures from films therein, a corresponding plurality of television cameras connected thereto, a television monitor connected to each camera, a master editing monitor adapted to receive pictures from each of said individual projectors at mutually exclusive times, means for advancing said films in said projectors and a film record medium synchronously, a control tone generator, an erase voltage generator, a plurality of record-reproduce heads adapted to record a control tone on and detect said control tone from said record medium, means for connecting said control tone generator to each of said heads at mutually exclusive times, and means for connecting said erase voltage generator to certain of said heads when said control tone generator is not connected thereto, said connecting means including a plurality of switches, and means interconnecting said switches, said generators, said heads, and said monitors for simultaneously selecting the individual monitors to be connected to said master monitor and the head to be connected to said tone generator.

2. An editing system in accordance with claim 1 in which said heads are arranged in groups, each group having the number of heads corresponding to the number of said projectors, switching means being provided for selecting the group of heads to receive said control tone over a certain period of operation of said system.

3. An editing system in accordance with claim 2 in which a reproducing circuit is provided for each of said heads, together with means for connecting said heads to said interconnecting means for selecting the projector to be connected to said master monitor.

4. An editing system in accordance with claim 3 in which said last-mentioned means includes a latching relay for each projector for connecting a selected magnetic head to said control tone generator and a selected projector to said master monitor, each of said latching relays being reset by the switches of said plurality of switches for said other projectors.

5. A motion picture film editing system comprising a plurality of film projectors adapted to project pictures from films in said projectors, a corresponding plurality of television receivers connected to said projectors, a master monitor, individual coaxial relays for interconnecting each of said television receivers to said master monitor when said relays are energized, a latching relay connected to each of said coaxial relays for energizing said respective coaxial relays, a control tone generator, an erase voltage generator, said generators being connectable to said latching relay, means adapted to advance a magnetic record medium synchronously with the films in said projectors, two groups of magnetic heads adapted to record a control tone on and reproduce said control tone from said medium, the number of heads in each of said groups corresponding to the number of projectors, each of said latching relays interconnecting said control tone generator to its associated head, said respective latching relay also connecting said erase voltage generator to the remaining magnetic heads of each group, and switch means corresponding in number to each of said projectors for actuating their respective latching relays and for resetting the latching relays of said other projectors.

6. A motion picture film editing system in accordance with claim 5 in which means are provided for reversing the direction of travel of said magnetic record medium, together with means adapted to disconnect said control tone generator and said erase voltage generator from said latching relays.

7. A motion picture film editing system in accordance with claim 6 in which means are provided for connecting said erase voltage generator to all of said magnetic heads in a selected one of said groups during the advancement of said magnetic film in one direction.

8. In an editing system for a plurality of motion picture films, the combination of a plurality of projectors adapted to project pictures from films therein, a corresponding plurality of television cameras connected thereto, a monitor connectable to each camera, a relay for each camera adapted to connect and disconnect said camera from said monitor, means adapted to advance a magnetic recording medium in synchronism with the films in said projectors, magnetic heads associated with said magnetic medium for recording a signal on and reproducing said signal from said medium, a control tone generator, an erase voltage generator, a latching relay for interconnecting said generators and a selected magnetic head, a disconnect record relay between said control tone generator and said latching relay, a disconnect erase voltage relay between said erase voltage generator and said latching relay, said disconnect relays having their contacts normally closed for transmitting control tone and erase voltages to said latching relay, a reversing switch for reversing the direction of travel of said magnetic medium, and interconnecting circuits between said disconnect relays and said reversing switch for energizing said disconnect relays to disconnect said control tone generator and said erase voltage generator from said latching relay during the advancement of said magnetic record medium in one direction.

9. An editing system in accordance with claim 8 in which circuits are provided for de-energizing said disconnect erase voltage relay during the advancement of said record medium in said one direction to connect said erase voltage generator to said magnetic heads for erasing any signal thereon.

10. A multiple motion picture film editing system comprising a plurality of motion picture reproducing channels, a picture monitor, switching means for interconnecting any one of said channels to said monitor, said switching means including manual switches and relays individual to said channels, a control tone generator, a magnetic erase voltage generator, means adapted to advance a magnetic record medium in synchronism with the films in said motion picture channels, a plurality of magnetic heads associated with said medium for recording a control tone on said medium to indicate the channel connected to said monitor and reproducing said control tone from said medium, said heads being arranged in groups, the number of heads in each group corresponding to the number of said channels, and means for switching said groups of heads to and from said control tone generator.

11. A multiple motion picture film editing system in accordance with claim 10 in which a reproducing amplifier is provided for each of said channels, said amplifiers being respectively connected to said groups of heads during reproduction and to said relays for controlling the switching of said channels to said picture monitor in accordance with the original operation of said manual switches.

12. A multiple motion picture film editing system in accordance with claim 10 in which means are provided for connecting one of said heads in one group to said control tone generator while a head in another of said groups is reproducing said control tone previously recorded, said relays being responsive to the output of said amplifiers.

References Cited in the file of this patent

UNITED STATES PATENTS

| | | |
|---|---|---|
| 2,405,246 | Watson | Aug. 6, 1946 |
| 2,706,218 | Wootten | Apr. 12, 1955 |

FOREIGN PATENTS

| | | |
|---|---|---|
| 1,083,466 | France | Jan. 10, 1955 |

OTHER REFERENCES

"Magnetic Recording Handbook" (R.E.B. Hickman), published by George Newnes Limited (London), 1956, pages 148–149.